(12) United States Patent
Fath et al.

(10) Patent No.: US 11,759,725 B1
(45) Date of Patent: Sep. 19, 2023

(54) MULTISTAGE FLASH DESALINATION SYSTEM

(71) Applicant: KING FAHD UNIVERSITY OF PETROLEUM AND MINERALS, Dhahran (SA)

(72) Inventors: Hassan El-Banna Fath, Calgary (CA); Mohamed Abdelkarim Antar, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/696,963

(22) Filed: Mar. 17, 2022

(51) Int. Cl.
| | | |
|---|---|---|
| *B01D 3/06* | (2006.01) | |
| *B01D 1/30* | (2006.01) | |
| *B01D 5/00* | (2006.01) | |
| *B01D 1/28* | (2006.01) | |
| *B01D 3/00* | (2006.01) | |
| *C02F 1/06* | (2023.01) | |
| *C02F 1/14* | (2023.01) | |

(Continued)

(52) U.S. Cl.
CPC .......... *B01D 3/065* (2013.01); *B01D 1/0035* (2013.01); *B01D 1/28* (2013.01); *B01D 1/305* (2013.01); *B01D 3/007* (2013.01); *B01D 5/0003* (2013.01); *C02F 1/041* (2013.01); *C02F 1/06* (2013.01); *C02F 1/14* (2013.01); *C02F 2103/08* (2013.01); *C02F 2201/009* (2013.01)

(58) Field of Classification Search
CPC ........ B01D 1/0035; B01D 1/28; B01D 1/305; B01D 3/065; B01D 3/007; B01D 5/0003; C02F 1/041; C02F 1/06; C02F 1/14; C02F 2103/08; C02F 2201/009

See application file for complete search history.

(56) References Cited

U.S. PATENT DOCUMENTS

| | | | | |
|---|---|---|---|---|
| 2,894,879 A | * | 7/1959 | Hickman | B01D 3/24 196/115 |
| 3,206,379 A | * | 9/1965 | Hill | B01D 1/16 159/4.04 |
| 3,232,847 A | * | 2/1966 | Hoff | B01D 1/26 203/DIG. 17 |

(Continued)

FOREIGN PATENT DOCUMENTS

| | | |
|---|---|---|
| CN | 105329963 B | 10/2017 |
| CN | 111533198 A | 8/2020 |
| DE | 35 40 730 C2 | 12/1993 |

*Primary Examiner* — Jonathan Miller
(74) *Attorney, Agent, or Firm* — Oblon, McClelland, Maier & Neustadt, L.L.P.

(57) ABSTRACT

A multistage flash (MSF) desalination system is described. The MSF desalination system comprises a feed tank, a brine heater (BH), an MSF tower with n number of stages, n–1 number of condensers each with an inlet and an outlet, and a desalinated water tank. Herein, the feed tank is connected to a first pump, which is connected to the BH; the MSF tower comprises a stepped pyramid shape with n number of connected chambers. The n number of stages each contains at least one flash spray nozzle and a demister. The flash spray nozzles are fluidly connected to drainage of the previous stage, with the flash spray nozzle in the first stage connected to the BH. Further, the condensers are connected to the demisters in n–1 stages and to the next condenser, with the last condenser connected to a second pump, which is connected to the desalinated water tank.

18 Claims, 4 Drawing Sheets

(51) Int. Cl.
   *B01D 1/00*   (2006.01)
   *C02F 1/04*   (2023.01)
   *C02F 103/08*  (2006.01)

(56) References Cited

U.S. PATENT DOCUMENTS

| | | | | |
|---|---|---|---|---|
| 3,351,120 A * | 11/1967 | Goeldner | ............ | B01D 1/26 |
| | | | | 159/DIG. 22 |
| 3,446,712 A * | 5/1969 | Othmer | ............ | C02F 1/16 |
| | | | | 202/205 |
| 3,692,634 A * | 9/1972 | Othmer | ............ | B01D 3/065 |
| | | | | 203/25 |
| 3,816,266 A * | 6/1974 | Izumi | ............ | C02F 1/06 |
| | | | | 202/173 |
| 3,849,259 A * | 11/1974 | Steinbruchel | ............ | C02F 1/06 |
| | | | | 159/DIG. 13 |
| 3,941,663 A * | 3/1976 | Steinbruchel | ............ | B01D 1/26 |
| | | | | 159/46 |
| 4,624,747 A * | 11/1986 | el Din Nasser | ............ | B01D 1/065 |
| | | | | 203/40 |
| 4,636,283 A * | 1/1987 | Nasser | ............ | B01D 1/065 |
| | | | | 159/DIG. 42 |
| 4,982,782 A * | 1/1991 | Albers | ............ | B01D 53/18 |
| | | | | 261/153 |
| 5,020,335 A * | 6/1991 | Albers | ............ | C02F 1/10 |
| | | | | 261/153 |
| 9,539,522 B1 * | 1/2017 | El-Sayed | ............ | B01D 1/26 |
| 9,643,102 B2 * | 5/2017 | Al-Sulaiman | ............ | B01D 1/26 |
| 2015/0353377 A1 * | 12/2015 | Al-Sulaiman | ............ | C02F 1/043 |
| | | | | 261/114.2 |

* cited by examiner

MULTISTAGE FLASH DESALINATION SYSTEM

BACKGROUND

Technical Field

The present disclosure is directed to a multistage flash (MSF) desalination system; and more particularly to a renewable energy driven MSF desalination system utilizing flash chambers-condensers separation and mechanical/thermal vapor compression.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Thermal desalination systems offer a solution to address the fresh water needs of coastal and remote areas. In particular, renewable energy (RE) driven thermal desalination systems provide a green and viable cost-effective solution for such purpose. The main principle of thermal desalination depends basically on evaporation and condensation processes, where the concentrated salt and other mixed particulates are generally discarded. Currently, many desalination plants implement multistage flash (MSF) desalination system technology, however plants that are newly built tend to incorporate reverse osmosis for desalination. Therefore, research into improving the cost, efficiency, and environmental impact of MSF desalination is important to compete with other technologies.

Conventionally, an MSF desalination system is either implemented as a once through (MSF-OT) system or brine recirculation (MSF-BR) system, which include horizontally stacked stages in succession with a built-in condenser tube arranged longitudinal or transversely inside the flash chambers of both heat recovery and (in case of MSF-BR) heat rejection sections. The units are equipped with a venting system and may be equipped with mechanical vapor compression (MVC). Heat input is supplied by steam that is provided by a standalone external boiler or extracted heating steam from a backpressure or low pressure turbine of a power plant in cogeneration systems.

In an MSF-OT arrangement, seawater at a certain mass flow rate enters a condenser (or heat recovery section) via a seawater inlet. The MSF-OT arrangement includes 'N' stages, as the seawater passes through each stage of the condenser, flashing vapor raises the seawater temperature. In particular, the intake seawater flows from stage 'N' to stage '1', i.e., from the low to high temperature stages of the condenser. This heated seawater is then passed through a brine heater, which represents the external heat addition component where a relatively low-pressure (around 1.5 to 2 MPa) heating steam is used to heat the seawater (brine). During this process, the heating steam releases its latent heat of condensation to the preheated feed brine. The heated brine, which is at a top brine temperature (TBT), leaves the brine heater and is directed to flashing chambers. Further, one or more demisters are used to distill vapors from the flashing chambers, and the distillate is collected, to be transferred to distilled water tank for storage and later use purposes.

These conventional MSF systems, including the MSF-OT arrangement and the MSF-BR arrangement, have complex processes design, manufacturing, transport, assembly, commissioning, as well as operation and maintenance (O&M), especially for flashing chambers and condensers, which in turn leads to an increase in capital expenditures (CAPEX) and operational expenditures (OPEX) for desalination plants implementing such MSF systems. Moreover, these conventional MSF systems require supports and stiffeners which are used to hold the heavy condensers on top of the flash chambers, which further leads to complex design and increased CAPEX.

Further studies have been done to investigate possibilities to lower CAPEX. Different configurations of MSF and integrated MSF—multi-effect distillation (MED) were proposed including; i-MSF flash chamber split (FCS), vertical stack (VS), two trains of parallel condensers with two brine heaters and multiple condensers and multiple flash chambers for very large capacity MSF. In addition, the concept of partial brine extraction from high pressure stages to lower pressure stages was introduced to shift the production to lower stages of less tubes cost. See Hassan E. S. Fath, High Performance MSF and Integrated MSF-MED process & Apparatus, U.S. Provisional Patent No. 61/341,285-032910 (2010)], hereby incorporated by reference its entirety.

Recently, many researchers are also focusing on specific electrical power consumption and performance optimization utilizing a portion of generated vapor and again recirculating it by mixing with the motive steam in a vapor compressor (VC). A green energy source, such as solar or wind, is also used to reduce the environmental impact of operating the MSF systems.

Each of the aforementioned configurations suffers from one or more drawbacks hindering their adoption. The existing MSF systems are not particularly modular in a way that makes them suitable for various size and production requirements. Furthermore, the existing MSF systems do not provide techniques for economic use of materials to avoid excessive use of expensive materials for corrosion resistance.

Accordingly, it is an object of the present disclosure to provide a multistage flash (MSF) desalination system which can be renewable energy driven, with a stepped pyramid shape (SPS), flash chambers-condensers separation (FCCS) and mechanical vapor compression (MVC) and/or thermal vapor compression (TVC) to simplify the processes design, manufacturing, transport, assembly, commissioning, O&M, and improve the overall energy efficiency.

SUMMARY

In an exemplary embodiment, a multistage flash (MSF) desalination system is described. The MSF desalination system comprises a feed tank, a brine heater (BH), an MSF tower with n number of stages, n−1 number of condensers each with an inlet and an outlet, and a desalinated water tank. In some embodiments, n number of stages is 2-40. Herein, the feed tank is fluidly connected to a first pump. The first pump is fluidly connected to the BH at a higher elevation located at a top of the MSF tower. Further, the MSF tower comprises a stepped pyramid shape with n number of connected chambers forming stages. The n number of stages are located stepwise below each other slip stacked at a 10-50° angle. The n number of stages are increasing in volume by 10-30% with each stage. The n number of stages have a drainage on a bottom face. The n number of stages each contains at least one flash spray nozzle and a demister. The flash spray nozzles are fluidly connected to the drainage of the previous stage other than the flash spray nozzle in a first stage at the top of the MSF tower. Herein, the flash spray nozzle in the first stage at the top of the MSF tower is fluidly connected to the BH. Further, the inlet of the condensers are fluidly connected to the demisters in n−1 stages of the MSF tower. The outlet of the condensers are fluidly connected to the next condenser of n−1 condensers. The outlet of the last condenser is fluidly connected to a second pump. The second pump is fluidly connected to the desalinated water tank. The drainage of a final stage at a bottom of the MSF tower is fluidly connected to a third pump. The third pump is fluidly connected to a rejected brine tank.

In some embodiments, the chambers have the same height throughout the MSF tower.

In some embodiments, the chamber is made from at least one of the materials selected from the group consisting of stainless steel, polycarbonate, polypropylene, polyurethane, polyethylene, polystyrene, and polyvinyl chloride.

In some embodiments, the n number of flash spray nozzles are angled 10-50° towards the direction of the next stage.

In some embodiments, the third pump is fluidly connected to the feed tank.

In some embodiments, the condensers are short tube heat exchangers. Herein, the short tube heat exchangers are arranged adjacent to the MSF tower. Further, the short tube heat exchangers are made from at least one of the materials from the group consisting of aluminum, copper, stainless steel, nickel and titanium.

In some embodiments, the BH and the flash spray nozzle in the first stage are connected by a tube made of titanium or 60-70 wt % copper with 30-40 wt % nickel. Further, the demisters and the inlet of the condensers, and the drainage of one stage to the flash spray nozzle (s) of next stage in the MSF tower in a top half of the MSF tower are connected by a tube made of titanium and/or 60-70 wt % copper with 30-40 wt % nickel. And, the demisters and the inlet of the condensers, and the drainage of one stage to the flash spray nozzles of next stage in the MSF tower in a bottom half of the MSF tower are connected by a tube made of 80-90 wt % copper with 10-20 wt % nickel and/or 50-60 wt % aluminum with 40-50 wt % bronze.

In some embodiments, the MSF desalination system further comprises a compressor, a pressure stabilizer, and a desuperheater. Herein, the demister of the final stage at the bottom of the MSF tower is fluidly connected to the compressor. The compressor is fluidly connected in series to the pressure stabilizer and then the desuperheater. The desuperheater is fluidly connected to the BH.

In some embodiments, the compressor is selected from the group consisting of a mechanical vapor compressor, a thermal vapor compressor, and an absorption compression system.

In some embodiments, the MSF desalination system further comprises an intercooler with a first and second end, and a second compressor. Herein, the intercooler is fluidly connected to the compressor on the first end and the second compressor on the second end. Further, the second compressor is fluidly connected to the pressure stabilizer.

In some embodiments, the MSF desalination system further comprises a compressor with a first and second end. Herein, the compressor is fluidly connected on the first end to an opening in the first stage of the MSF tower. Further, the compressor is fluidly connected to the pressure stabilizer on the second end.

In some embodiments, the drainage of at least one of the stages in a top half of the MSF tower is fluidly connected to the flash spray nozzle of at least one of the stages in a bottom half of the MSF tower.

In some embodiments, the MSF desalination system further comprises a parabolic trough collector, a heat exchanger with four connection points, and heat transfer fluid. Herein, the heat exchanger is fluidly connected to the outlet of a first condenser after the first stage in the MSF tower at a first connection point and to the BH at a second connection point. A fourth pump on one end is fluidly connected to the heat exchanger at a third connection point and on another end to the parabolic trough collector. The parabolic trough collector is fluidly connected to the heat exchanger at a fourth connection point, on an opposite end of the third connection point to the fourth pump. The heat transfer fluid travels through the connection points of the heat exchanger, the fourth pump, and the parabolic trough collector.

In some embodiments, the heat transfer fluid is selected from a group consisting of: distilled water and thermal oil.

In some embodiments, the MSF desalination system further comprises a parabolic trough collector, and a flash tank with three connection points. Herein, the parabolic trough collector is fluidly connected to the outlet of a first condenser after the first stage in the MSF tower on one end and a first connection point of the flash tank on the opposite end. A second connection point of the flash tank is fluidly connected to a tube between the first condenser and the parabolic trough collector. And, a third connection point of the flash tank is fluidly connected to the BH.

In some embodiments, the MSF desalination system further comprises a parabolic solar dish. Herein, the parabolic solar dish is angled towards the BH.

In some embodiments, the system is electrically connected to at least one from the group consisting of a photovoltaic panel, a wind turbine, and a bio-diesel engine.

In some embodiments, a plurality of MSF towers is connected in parallel.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
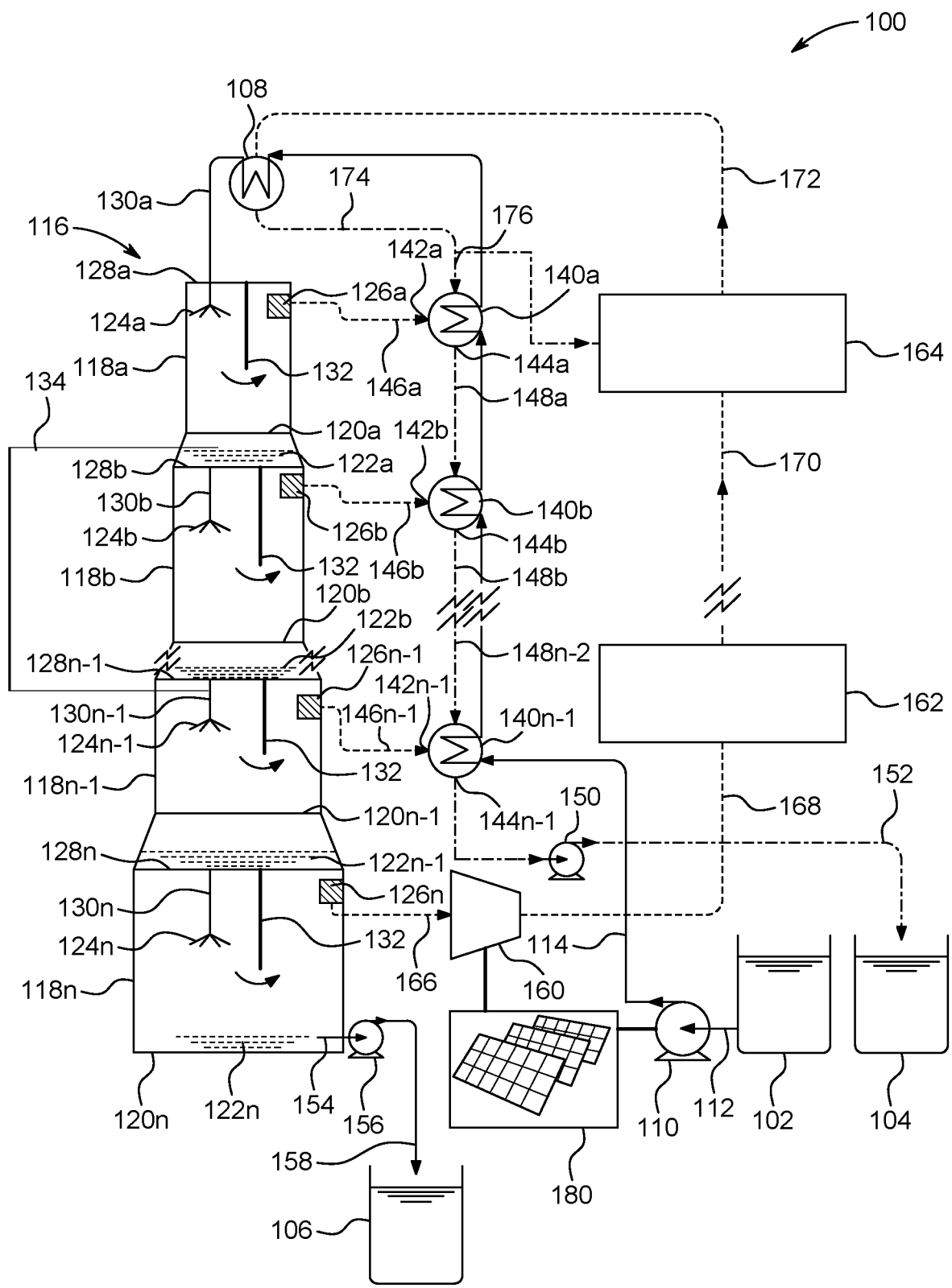
FIG. 1 is a schematic of a multi-stage flash (MSF) desalination system, according to a first embodiment.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In some embodiments, this disclosure is directed to a multistage flash (MSF) desalination system which is renewable energy (RE) driven, with stepped pyramid shape (SPS), and utilizing flash chambers-condensers separation (FCCS) and mechanical vapor compression (MVC) and/or thermal vapor compression (TVC). Although the present MSF desalination system may be employed to evaporate any suitable liquid solution to separate the solvent from the solute, it is primarily and especially suited for recovering pure or at least potable water from impure water such as brackish or seawater. The present MSF desalination system retains the advantages of other systems heretofore proposed without many of the disadvantages of such systems. In the MSF desalination system of the present disclosure, the seawater may be fully utilized until it is reduced to an enriched brine before removal therefrom, while recirculation of brine and heat is advantageously employed to reduce power consumption for heating of seawater, and thus the MSF desalination system can be operated by electric energy generated from renewable sources, or connected to a green engine that operates on a clean source of bio-fuel, to reduce the carbon footprint and be more environmentally friendly.

Referring to FIG. 1, a schematic view of a multistage flash (MSF) desalination system 100 is illustrated, according to a first embodiment of the present disclosure. As shown, the MSF desalination system 100 includes a feed tank 102, a desalinated water tank 104 and a rejected brine tank 106. The feed tank 102, the desalinated water tank 104 and the rejected brine tank 106 may be formed by metal or polymer housing structure of generally cuboidal or cylindrical shape, as is well known in the art. It may be appreciated that the feed tank 102, the desalinated water tank 104 and the rejected brine tank 106 may be defined to have sufficient internal volume to hold/store corresponding volume of saltwater, desalinated water and waste (concentrated brine) therein, from operations of the MSF desalination system 100.

The MSF desalination system 100 also includes a brine heater (BH) 108. Further, the MSF desalination system 100 includes a first pump 110. The first pump, and any pump throughout the present disclosure are at least one of a centrifugal pump and a rotary pump. As illustrated, the feed tank 102 is fluidly connected 112 to the first pump 110. Also, the first pump 110 is fluidly connected 114 to the BH 108. Herein, the brine heater 108 acts as a heat exchanger for heating of the saltwater (seawater, or brine), from the feed tank 102, for carrying out the distillation process in the MSF desalination system 100. In one or more aspects of the present disclosure, in the MSF desalination system 100, the heat is supplied to the brine heater 108 through heating steam coming from a boiler or other thermal plant. For example, the heat added in the brine heater 108 may come in the form of hot steam from an industrial plant co-located with the MSF desalination system 100. In an embodiment, the brine heater is powered by a renewable energy source discussed later in the detail description. In the brine heater 108, the steam is allowed to condense against tubes carrying the saltwater to cause heating of the saltwater.

The MSF desalination system 100 further includes an MSF tower 116. The MSF tower 116 has n number of stages, wherein n is 2-40. In particular, the MSF tower 116 includes a stepped pyramid shape with n number of connected chambers forming stages. For the purposes of the present disclosure, the terms "step", "stage" and "chamber" have been generally interchangeably used without any limitations. As illustrated in FIG. 1, the MSF tower 116 employs a plurality of chambers 118a, 118b, . . . , 118n-1, 118n, in which the chamber 118a is the first and highest pressure stage, the chamber 118b is below the chamber 118a, the chamber 118n-1 is preceding a lowest pressure stage (i.e., the chamber 118n), and the chamber 118n is the last and lowest pressure stage. Any desired number of intervening stages may be employed, hence a portion of the MSF tower 116 has been broken away between the chambers 118b and 118n-1 to represent intervening chambers (not shown). In one or more examples, the chambers 118a, 118b, . . . , 118n-1, 118n in the MSF tower 116 may be in the form of staged flash evaporation chambers as known in the art of desalination systems.

In the present configuration, the n number of stages are located stepwise below each other axially slip stacked at a 10-50° angle, preferably 20-40°, or 30-35°. Further, the n number of stages are increasing in volume by 10-30%, preferably 15-25%, or 18-22% with each stage. That is, the chamber 118b has 10-30% increased volume compared to the chamber 118a, and so on. In an aspect of the present disclosure, the chambers 118a, 118b, . . . , 118n-1, 118n have the same height throughout the MSF tower 116. That is, each of the chambers 118a, 118b, . . . , 118n-1, 118n has generally same height in the MSF tower 116. With the increasing volume of immediate lower chamber compared to upper chamber and the height of the chambers 118a, 118b, . . . , 118n-1, 118n being same throughout the MSF tower 116, the MSF tower 116 adapts the stepped pyramid shape, with the immediate lower (next) chamber having larger width compared to the upper (preceding) chamber. That is, the chamber 118b has about 10-30% increased width compared to the chamber 118a; the chamber 118n-1 has about 10-30% increased width compared to the chamber 118n, and the like. The increase in volume with each stage allows for more structural stability, and the vertical stepped structure helps to reduce the unit foot-print. This structure further improves the flashing process of the brine by the added gravity effect to the inter-stage pressure difference and therefore reduces the thermodynamic losses to enhance the unit performance.

In an aspect of the present disclosure, then number of stages is 2-40, preferably 5-30, or 10-20. That is, the number of chambers 118a, 118b, . . . , 118n-1, 118n in the MSF tower 116 varies between 2 and 40. Specifically, the MSF tower 116 may include at least 2 number of stages (i.e., at least two staged flash evaporation chambers) therein. As generally known in the art, the chambers 118a, 118b, . . . , 118n-1, 118n may be formed by metal housing structure of generally frustoconical or parallelopiped shape. The present MSF desalination system may also reduce cost and weight in the flashing evaporators by containing only the spraying components, and demisters, which can further be made of non-metallic material of light weight and low cost (CAPEX Reduction) and minimized corrosion (OPEX Reduction). In an aspect of the present disclosure, each of the chambers 118a, 118b, . . . , 118n-1, 118n is made from at least one of but not limited to stainless steel, polycarbonate, polypropylene, polyurethane, polyethylene, polystyrene, and polyvinyl chloride. Such materials that are known to withstand high temperatures and high pressures, and further provide structural rigidity to the chambers 118a, 118b, . . . , 118n-1, 118n, may also be used to make the chambers.

Also, as illustrated in FIG. 1, in the MSF tower 116, the n number of stages have a drainage on a bottom face. That is, each of the chambers 118a, 118b, . . . , 118n-1, 118n in the MSF tower 116 has a respective bottom face 120a, 120b, ..., 120n-1, 120n. Further, the bottom face 120a, 120b, ..., 120n-1, 120n in each of the chambers 118a, 118b, ..., 118n-1, 118n is provided with a respective drainage 122a, 122b, ..., 122n-1, 122n. Herein, each of the drainage 122a, 122b, ..., 122n-1, 122n may be in the form of a compartment or cavity, generally, in the respective bottom face 120a, 120b, ..., 120n-1, 120n for the corresponding chamber 118a, 118b, ..., 118n-1, 118n. The drainage 122a, 122b, ..., 122n-1, 122n may allow temporary storage of water collected in the corresponding chamber 118a, 118b, ..., 118n-1, 118n, which may flow therein due to action of gravity because of its placement. It may be appreciated that, in some examples, the size (volume) of the drainage 122a, 122b, ..., 122n-1, 122n may increase from the higher stage to the lower stage in the MSF tower 116, as the lower chambers may have larger volume of water reject therein, and thus to be stored in the corresponding drainage 122a, 122b, ..., 122n-1, 122n.

Further, the n number of stages each contains at least one flash spray nozzle and a demister. Each of the chambers 118a, 118b, ..., 118n-1, 118n in the MSF tower 116 includes a respective flash spray nozzle 124a, 124b, ..., 124n-1, 124n and a respective demister 126a, 126b, ..., 126n-1, 126n. In the present configuration, the flash spray nozzle 124a, 124b, ..., 124n-1, 124n is proximal to an upper portion of the chamber 118a, 118b, ..., 118n-1, 118n. That is, each of the chambers 118a, 118b, ..., 118n-1, 118n in the MSF tower 116 has a respective upper portion 128a, 128b, ..., 128n-1, 128n, and the flash spray nozzle 124a, 124b, ..., 124n-1, 124n in each of the chamber 118a, 118b, ..., 118n-1, 118n is disposed (supported) at the corresponding upper portion 128a, 128b, ..., 128n-1, 128n thereof, in an axial orientation with the MSF. In an embodiment, there are more than one flash spray nozzle in a chamber. Each chamber is not required to contain the same amount of flash spray nozzles. Herein, it may be understood that the upper portions 128a, 128b, ..., 128n-1, 128n of the chambers 118a, 118b, ..., 118n-1, 118n are opposite to the bottom faces 120a, 120b, ..., 120n-1, 120n for the corresponding chamber 118a, 118b, ..., 118n-1, 118n. In the illustration of FIG. 1, an arrow (not labelled) has been shown in each of the chambers 118a, 118b, ..., 118n-1, 118n to indicate flow of vapors (sprayed water) as dispersed by each of the flash spray nozzles 124a, 124b, ..., 124n-1, 124n in the respective chamber 118a, 118b, ..., 118n-1, 118n (as will be discussed later in description in more detail), to the corresponding demisters 126a, 126b, ..., 126n-1, 126n, in the respective chamber 118a, 118b, ..., 118n-1, 118n.

In an aspect of the present disclosure, the n number of flash spray nozzles 124a, 124b, 124n-1, 124n are angled 10-50° angle, preferably 20-40°, or 30-35° towards the direction of the next stage. That is, the flash spray nozzle 124a in the chamber 118a may be angled 10-50° with respect to a vertical axis of the next chamber, i.e., the second chamber 118b; and so on. In an example, the flash spray nozzle 124a, 124b, ..., 124n-1, 124n may be angled towards the corresponding demister 126a, 126b, ..., 126n-1, 126n, in the respective chamber 118a, 118b, 118n-1, 118n. Thus, the water sprayed by the flash spray nozzle 124a, 124b, ..., 124n-1, 124n may be dispersed at an angle in the respective chamber 118a, 118b, ..., 118n-1, 118n to be efficiently received by the corresponding demister 126a, 126b, ..., 126n-1, 126n, which may help with water separation therefrom as required (as discussed later in the description). In the illustration of FIG. 1 the flash spray nozzles have been shown to extend varying lengths into the chamber this is exemplary only and shall not be construed limiting to the disclosure in any manner. In some embodiments, the flash spray nozzles extend into their respective chambers at the same length. The angle of liquid spray from the flash spray nozzles is preferably the same as the slip stack angle. In this configuration the MSF achieves improved efficiency by avoiding unproductive spray onto the chamber wall.

Further, as shown in FIG. 1, each of the chambers 118a, 118b, ..., 118n-1, 118n in the MSF tower 116 includes a separation wall or extension 132. The separation walls 132 in the chambers 118a, 118b, ..., 118n-1, 118n separate the corresponding flash spray nozzles 124a, 124b, ..., 124n-1, 124n and the corresponding demisters 126a, 126b, ..., 126n-1, 126n, in the respective chamber 118a, 118b, ..., 118n-1, 118n. Although in the illustration of FIG. 1, the separation walls 132 have been shown to be slightly closer to the demisters 126a, 126b, 126n-1, 126n in the corresponding chambers 118a, 118b, ..., 118n-1, 118n, this is exemplary only and shall not be construed limiting to the disclosure in any manner; and in other examples, the separation walls 132 may be located laterally in a middle between the corresponding flash spray nozzles 124a, 124b, ..., 124n-1, 124n and the corresponding demisters 126a, 126b, 126n-1, 126n, in the respective chamber 118a, 118b, ..., 118n-1, 118n. In still other examples, the flash spray nozzles 124a, 124b, ..., 124n-1, 124n may be located laterally in the middle in the respective chamber 118a, 118b, ..., 118n-1, 118n without any limitations. Also, although in the illustration of FIG. 1, the separation walls 132 have been shown to be extending to somewhat middle of vertical height of the respective chamber 118a, 118b, ..., 118n-1, 118n; in other examples, the separation walls 132 may be (extending) shorter or longer without departing from the spirit and the scope of the present disclosure. Further, although in the illustration of FIG. 1, each of the demisters 126a, 126b, ..., 126n-1, 126n have been shown to be projecting inward in the respective chamber 118a, 118b, ..., 118n-1, 118n; in other examples, the demisters 126a, 126b, ..., 126n-1, 126n may be flush with corresponding walls of the respective chambers 118a, 118b, ..., 118n-1, 118n without any limitations. Further, in some examples, the demister 126a, 126b, ..., 126n-1, 126n may be alternatively placed in a corresponding tube 146a, 146b, 146n-1 between the respective chambers 118a, 118b, ..., 118n-1, 118n and the condensers 140a, 140b, ..., 140n-1 and the compressor 160, to allow for its on-line-cleaning using part of the distillate and the reject the cleaning water to the rejected brine tank 106 (connection not shown).

Also, the flash spray nozzles are fluidly connected to the drainage of the previous stage other than the flash spray nozzle in a first stage 118a at the top of the MSF tower 116. That is, as shown in FIG. 1, the flash spray nozzles 124b, ..., 124n-1, 124n of the chambers 118b, ..., 118n-1, 118n are fluidly connected 130b, ..., 130n-1, 130n to the drainage 122a, 122b, ..., 122n-1 of the respective immediate upper chamber 118a, 118b, ..., 118n-1. Further, the flash spray nozzle in the first stage 118a at the top of the MSF tower 116 is fluidly connected to the BH 108. That is, as shown in FIG. 1, the flash spray nozzle 124a of the chamber 118a is fluidly connected 130a to the BH 108. This is possible, as the BH 108 is located at the top of the MSF tower 116, i.e., above the upper portion 128a of the chamber 118a of the MSF tower 116. It may be appreciated that although in the illustration of FIG. 1, the tubes 130b, ..., 130n-1, 130n have been shown to be extending significantly upwards from the respective upper portion 128b, ...,

128*n*-1, 128*n*; in practical configurations, the tubes 130*b*, . . . , 130*n*-1, 130*n* may be fluidly connected to corresponding openings (now shown) in the respective upper portion 128*b*, . . . , 128*n*-1, 128*n*, without any limitations.

In an aspect of the present disclosure, as illustrated in FIG. 1, the drainage 122*a* of at least one of the stages in a top half of the MSF tower 116 is fluidly connected 134 to the flash spray nozzle of at least one of the stages in a bottom half of the MSF tower 116. Herein, the top half and bottom half of the MSF tower 116 may be considered to include approximately half of the n number of stages 118*a*, 118*b*, . . . , 118*n*-1, 118*n* of the MSF tower 116. For example, if n=4, then the first two stages, i.e., the stages 118*a* and 118*b* may be considered to be part of top half of the MSF tower 116, and the two lowermost stages 118*n*-1 and 118*n* may be considered to be part of bottom half of the MSF tower 116. In an embodiment, the drainage (such as 122*a* or 122*b*) of at least one of the stages in a top-half (such as 118*a* or 118*b*) of the MSF tower 116 is fluidly connected 134 to the flash spray nozzle (such as, the flash spray nozzle 124*n*-1, 124*n*) of at least one of the stages (such as, the stages 118*n*-1, 118*n*) in a bottom half of the MSF tower 116. In the illustration of FIG. 1, the tube 134 is shown to be connecting the first stage 118*a* to the stage 118*n*-1 in the MSF tower 116, thereby skipping over the 118*b* stage. Further, the tube 134 is shown to be a 'C'-shaped connection; however, it may be contemplated that, in other examples, the tube 134 may be a straight connection passing through the stages, like the stage 118*b*, without any limitations.

Further, the MSF desalination system 100 includes n−1 number of condensers. That is, as illustrated in FIG. 1, the MSF desalination system 100 includes condensers 140*a*, 140*b*, 140*n*-1. Each condenser 140*a*, 140*b*, . . . , 140*n*-1 has a respective inlet 142*a*, 142*b*, . . . , 142*n*-1 and a respective outlet 144*a*, 144*b*, . . . , 144*n*-1. That is, the condenser 140*a* has the inlet 142*a* and the outlet 144*a*; and so on. The condensers 140*a*, 140*b*, . . . , 140*n*-1 at the inlet 142*a*, 142*b*, . . . , 142*n*-1 are fluidly connected 146*a*, 146*b*, . . . , 146*n*-1 to the demisters in n−1 stages of the MSF tower 116. That is, the condensers 140*a*, 140*b*, 140*n*-1 at the inlet 142*a*, 142*b*, 142*n*-1 are fluidly connected 146*a*, 146*b*, . . . , 146*n*-1 to the corresponding demisters 126*a*, 126*b*, . . . , 126*n*-1 in the stages 118*a*, 118*b*, . . . , 118*n*-1 of the MSF tower 116. Further, the condensers 140*a*, 140*b*, 140*n*-1 at the outlet 144*a*, 144*b*, . . . , 144*n*-1 are fluidly connected 148*a*, 148*b*, 148*n*-2 to the next condenser of n−1 condensers. That is, the condenser 140*a* is fluidly connected 148*a* to the condenser 140*b*, the condenser 140*b* is fluidly connected 148*b* to the corresponding next condenser (not shown), and the condenser (not shown) preceding the condenser 140*n*-1 is fluidly connected 148*n*-2 to the condenser 140*n*-1.

As shown in FIG. 1, the last condenser (i.e., the condenser 140*n*-1) is fluidly connected 148*n*-1 to a second pump 150. Also, as shown, the second pump 150 is fluidly connected 152 to the desalinated water tank 104. Further, as shown, the drainage 122*n* of a final stage (i.e., the stage 118*n*) at a bottom of the MSF tower 116 is fluidly connected 154 to a third pump 156. Furthermore, as shown, the third pump 156 is fluidly connected 158 to the rejected brine tank 106. In an aspect of the present disclosure, not shown in FIG. 1, the third pump 156 may also be fluidly connected (not shown) to the feed tank 102, to recycle the water which was not desalinated.

Further, as illustrated in FIG. 1, the MSF desalination system 100 includes a compressor 160, a pressure stabilizer 162 and a desuperheater 164. As shown, the demister 126*n* of the final stage (i.e., the stage 118*n*) at the bottom of the MSF tower 116 is fluidly connected 166 to the compressor 160. Also, the compressor 160 is fluidly connected in series to the pressure stabilizer 162 and then the desuperheater 164. As shown, the compressor 160 is fluidly connected 168 to the pressure stabilizer 162, which is in series to 170 fluidly connecting the compressor 160 to the desuperheater 164. Further, as shown, the desuperheater 164 is fluidly connected 172 to the BH 108. In some examples, the BH 108 may further be fluidly connected back 174 to the desuperheater 164. Further, in some examples, a tube 176 may branch out from the tube 174 to fluidly connected the BH 108 to the first condenser (i.e., the condenser 140*a*).

In an aspect of the present disclosure, the MSF desalination system 100 may include a plurality of MSF towers 116 connected in parallel. These multiple MSF towers 116 may be implemented to provide larger output of desalinated water, as per the requirement from the MSF desalination system 100. Further, in an aspect of the present disclosure, the MSF desalination system 100 may include a compressor, such as a secondary compressor (not shown) with a first and second end. The said compressor may be similar to the compressor 160 in functionality. The said compressor is fluidly connected on the first end to an opening in the first stage (i.e., the stage 118*a*) of the MSF tower 116. Further, the said compressor is fluidly connected to the pressure stabilizer 162 on the second end. This may be similar to how the compressor 160 is connected from one end to the last stage (i.e., the stage 118*n*) of the MSF tower 116 and to the pressure stabilizer 162 on the other end thereof. Such secondary compressor may be attached to one of the stages to extract some vapor and deliver it to the pressure stabilizer 162 (vapor tank) to enhance the heat addition process to the brine heater 108 for better system performance. This vapor eventually condenses in the brine heater 108 to maintain the productivity. In some examples, the MSF desalination system 100 may include multiple sets of compressors 160, pressure stabilizers 162 and desuperheaters 164, with each such set connecting to one of the last stages (such as, the stages 118*n*-1, 118*n*) without any limitations.

As may be understood, the MSF desalination system 100 is electrically connected to a power source 180. The power source 180 provides electric (or in some cases, motive power) for operation of the various components of the MSF desalination system 100, such as the compressor 160, various pumps, etc. In an aspect of the present disclosure, the MSF desalination system 100 is electrically connected to (in other words, the said power source 180 is) at least one selected from the group consisting of a photovoltaic panel, a wind turbine, and a combustion engine such as a diesel engine, run with biofuel. The configuration with the power source 180 being one of the photovoltaic panel, a wind turbine ensure that the MSF desalination system 100 is renewable energy (RE) driven for environmental sustainability. RE-driven desalination systems offer a green and viable cost-effective solution to address the fresh water needs of coastal and remote areas.

In the present configuration, the compressor 160 is a lower power, positive displacement mechanical vapor compressor(s) (MVC). In an aspect of the present disclosure, the compressor 160 is selected from the group consisting of a mechanical vapor compressor, a thermal vapor compressor (TVC), and an absorption compression (AB) system. Such compressor types are well known in the art. The low power positive displacement compressor for last stage(s) vapor recycle helps to reduce or eliminate MSF heat rejection and the brine heater external heating systems. This reduces the technical and economic burden of these sub-sections. This may further allow the increase of the flashing range, that could also be achieved from the BBT (Bottom Brine Temperature) side, as the last stage will be at a low temperature for vapor recycle. In an embodiment, the positive displacement MVC may be replaced by an AB system to thermally drive the recycled vapor.

In an aspect of the present disclosure, the condensers 140a, 140b, ..., 140n-1 are short tube heat exchangers (with the two terms being interchangeably used hereinafter). As illustrated in FIG. 1, the short tube heat exchangers 140a, 140b, ..., 140n-1 are arranged adjacent to the MSF tower 116. In an embodiment, the condensers are arranged vertically to the MSF with the respective inlet 142a, 142b, ..., 142n-1 towards the top and the outlet 144a, 144b, ..., 144n-1 towards the bottom of the MSF tower 116. In an embodiment, the condensers are arranged horizontally to the MSF tower. In one or more examples, the short tube heat exchangers 140a, 140b, ..., 140n-1 are made from at least one of the materials from the group consisting of aluminum, copper, stainless steel, nickel and titanium. The short tube heat exchangers, act similarly to the well-known long tube MSF in present technology and avoid the common MSF technology of cross tubes configuration that has disadvantages of high brine flow pressure drop and pumping power. Short condenser tubes will, therefore, reduce the electrical specific power consumption (SPC) leading main reduction of operation cost (OPEX). This will further eliminate the need for supports and stiffeners used to hold the heavy condensers on top of the flash chambers in the present technology (CAPEX reduction).

Further, in an aspect of the present disclosure, the tube 130a connecting the BH 108 and the flash spray nozzle 124a in the first stage 118a is made of titanium or 60-70 wt % copper with 30-40 wt % nickel. Further, in the present configuration, the tubes connecting various components in the top half of the MSF tower 116 are made from different material composition as compared to the tubes connecting various components in the bottom half of the MSF tower 116. The tubes can be made from any materials known in the art which may withstand the corrosion and pressure requirements of the system. In an example, the tubes 146a, 146b connecting the demisters 126a, 126b and the inlet 142a, 142b of the condensers 140a, 140b, and the tubes 130b connecting the drainage 122a of one stage (i.e., the stage 118a) to the flash spray nozzle 124b of next stage (i.e., the stage 118b) in the MSF tower 116 in the top half of the MSF tower 116 are made of titanium and/or 60-70 wt % copper with 30-40 wt % nickel. And, the tubes 146n-1 connecting the demisters 126n-1 and the inlet 142n-1 of the condensers 140n-1, and the tubes 130n connecting the drainage 122n-1 of one stage (i.e., the stage 118n-1) to the flash spray nozzles 124n of next stage (i.e., the stage 118n) in the MSF tower 116 in the bottom half of the MSF tower 116 are made of 80-90 wt % copper with 10-20 wt % nickel and/or 50-60 wt % aluminum with 40-50 wt % bronze. Herein, the top half of the MSF tower 116 usually experiences higher pressure as compared to the bottom half of the MSF tower 116, and thus the tubes connecting various components in the top half of the MSF tower 116 are made with material composition to withstand higher pressure resulting in a higher cost whereas the tubes connecting various components in the bottom half of the MSF tower 116 because of lower pressure withstanding requirement are made with material composition considering cost-effectiveness thereof. Therefore, tube 134 allows for the movement of water from the high-pressure stages at the top of the tower to be flashed at the lower pressure extraction stages at the bottom of the tower. Thereby shifting a portion of the workload to the chambers with cheaper materials. As the tubes' material cost is a main item of the MSF CAPEX, the shift of the vapor production load from high pressure stages to lower pressure stages significantly reduces the overall tubes cost (CAPEX reduction).

In the proposed MSF desalination system 100 that includes the MSF tower 116 of Stepped Pyramid Shape (SPS), the set of short tubes heat exchangers 140a, 140b, ..., 140n-1 acts as vapor condensers for flash chambers-condensers separation (F-CCS), to recover condensation energy from the heater vapor being condensed as received from the corresponding demister 126a, 126b, ..., 126n-1 and preheat saline feed water (FW) from the feed tank 102 using the recovered condensation energy. In the last stage(s) (i.e., the stage 118n), the compressor 160 is used to suck the flashed vapor from the corresponding demister 126n and compress it to high pressure and temperature as heating steam to heat brine at the brine heater 108 to its top brine temperature (TBT), 90-110° C., preferably 95-105° C., or approximately 100° C. In particular, a suction side of the compressor 160 sucks the vapor formed in the last effect(s) (i.e., the stage 118n) since there is no condenser being used at the stage 118n. The vapor is stabilized in the pressure stabilizer(s) 162 to provide a steady flow of heating steam with high pressure and temperature. The desuperheater reduces the temperature of the steam through the direct contact and evaporation of water to improve heat transfer and control the superheated steam. The desuperheater(s) 164 is added to provide the BH 108 with saturated heating steam as of the present art. The addition of the compressor, pressure stabilizer, and desuperheater allows for the recycling of heat thereby improving the overall efficiency of the system and reducing the amount of energy needed to operate.

In some examples, the power source 180, which may utilize solar PVs (or cooled PVT, CPVT), is used to generate the electrical energy required for the MSF desalination system 100. In some examples, a set of batteries may be employed to maintain the MSF desalination system 100 with electricity supply for 24/7 operation. Other back-up systems may also be used using other RE systems, static head water tank or bio-diesel engine. The pressure stabilizer 162 (vapor tank) may be enlarged to store the heating steam supplied to the BH 108 during cloudy periods and reduce the operating time of the compressor(s) 160 and therefore reduce the size of the storage batteries, if used. In some examples, the positive displacement compressor 160 may also be replaced by an absorption system to thermally drive the recycled vapor. For this purpose, the thermal energy may be generated using solar thermal system of solar heaters, solar concentrators of dish type solar tower systems.

In the operation of the MSF desalination system 100, the hot seawater (brine) at TBT is flashed in the first stage (i.e., the chamber 118a) at top of the MSF tower 116 (below the brine heater 108) through the flash spray nozzle 124a. The decrease in stage pressure (and the brine hydrostatic head) results in vapor flashed off in this stage. The flashed vapor leaves the chamber 118a through the corresponding demister 126a to get rid of entrained saline droplets that may be carried out by the vapor. In an embodiment, the demisters may be at least one of, a mesh-type coalescer, and a vane demister pad. Then, the vapor flows into an external, short tubes condenser 140a that condenses the vapor into pure water that is collected as a product in the desalinated water tank 104. The energy released due to vapor condensation is recovered to preheat saline feedwater to decrease the external input energy needed to heat the brine to its TBT.

Brine that is not flashed flows by gravity in addition to an inter-stage pressure reduction system to the next (below) stage (like from the stage 118a to the stage 118b, and so on) where the process of flashing (and vapor generation and then condensation) is repeated. This process of flow of brine from an upstream stage to a downstream stage continues till the last stage(s) (i.e., the stage 118b) whose vapor is used as input stream to the compressor 160 for vapor recycle. The brine leaving the last stage (i.e., the stage 118n) is either rejected (like in MSF-OT, to the rejected brine tank 106) or partially recycled (like in MSF-BR). In some examples, as discussed, the brine from a stage in the top half of the MSF tower 116 is passed to a stage in the bottom half of the MSF tower 116 via 134 to be flashed at a lower pressure stage requiring cheaper materials.

Now, distillate formed in each condenser (such as, the condensers 140a, 140b, . . . ) is condensed and passed to the next condenser (i.e., the respective next condensers 140b, 140n-1), which is again condensed in the said next condenser, and the total condensate is collected as the total product where it is pumped via the second pump 150 to the desalinated water tank 104.

The separation of the flash chambers and condensers has the advantage of simplifying the design, manufacturing, transport, assembly, and operation and maintenance (O&M) of both flashing chambers and condensers, thereby leading to CAPEX & OPEX reductions. The separation reduces the cost in the flashing chambers as they will contain only the spraying components, demisters, and flashing brine, and can thereby be made of cheaper materials, as previously described. The present MSF desalination system may also help in enhancement of the condensation process by selecting better vapor flow distribution and arrangement, avoiding condensate flooding on bottom rows, dry-out, or accumulation of non-condensable gases (NCG) of less heat transfer coefficient and high corrosion effect. The separation also allows for multiple MSF towers to run in parallel. In an embodiment, the demisters of multiple MSF towers can be fluidly connected to the same condensers.

Figure 2:
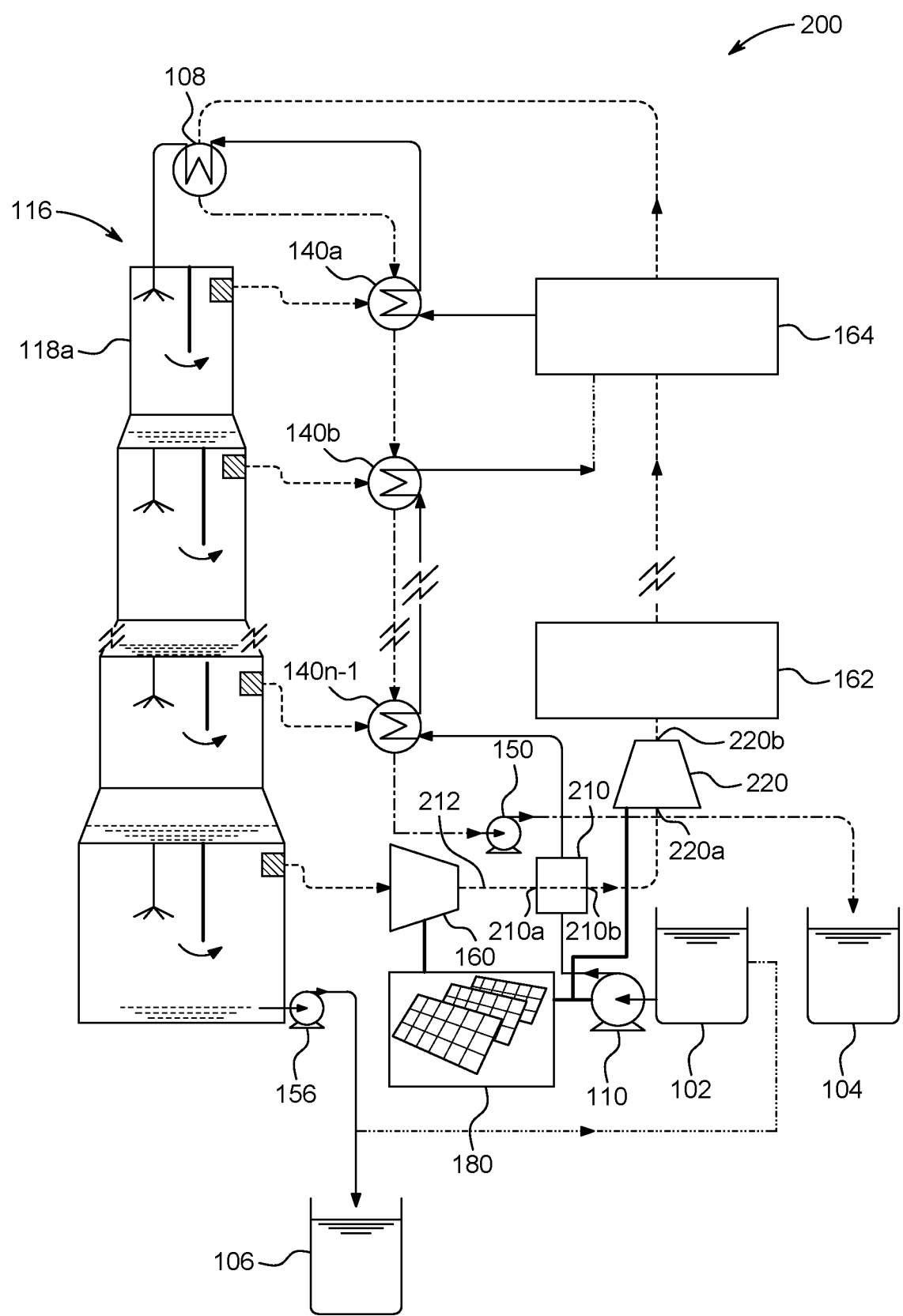
FIG. 2 is a schematic of a multi-stage flash (MSF) desalination system, according to a second embodiment.

Referring to FIG. 2, illustrated is a schematic of a multi-stage flash (MSF) desalination system 200 according to a second embodiment. The MSF desalination system 200 is similar to the MSF desalination system 100 as described in the preceding paragraphs, with generally similar configuration for the MSF tower 116 including its sub-components, the condensers 140a, 140b, . . . , 140n-1, etc. The above-mentioned details for components of the MSF desalination system 100 have not been repeated herein for the description of the MSF desalination system 200 for the brevity of the present disclosure. Further, in the illustration of FIG. 2 for the MSF desalination system 200, some of the components, as shown for the MSF desalination system 100 in FIG. 1, have been omitted and some of the components have not been labelled, for simplicity and brevity.

As illustrated in FIG. 2, the MSF desalination system 200 includes an intercooler 210. The intercooler 210 has a first end 210a and a second end 210b. The MSF desalination system 200 further includes a second compressor 220 with a first end 220a and a second end 220b. As shown, the intercooler 210 is fluidly connected 212 to the compressor 160 on the first end 210a and the second compressor 220 on the second end 210b. Also, as shown, the second compressor 220 is connected from the first end 220a to the intercooler 210. Further, as shown, the second compressor 220 is fluidly connected to the pressure stabilizer 162, from the second end 220b thereof. Furthermore, as shown, the intercooler 210 is fluidly connected to the feed tank 102 via the first pump 110. The intercooler 210 may be used to extract heat from the compressed vapors from the compressor 160 to heat up the saltwater passing therethrough before being supplied to the BH 108 via the condensers 140n-1, . . . , 140b, 140a. This may further allow to implement the second compressor 220 for further compressing the water vapors (because of some of the heat from first compression by the compressor 160 being removed therefrom), for reducing compression power and increasing efficiency of the MSF desalination system 200.

Figure 3:
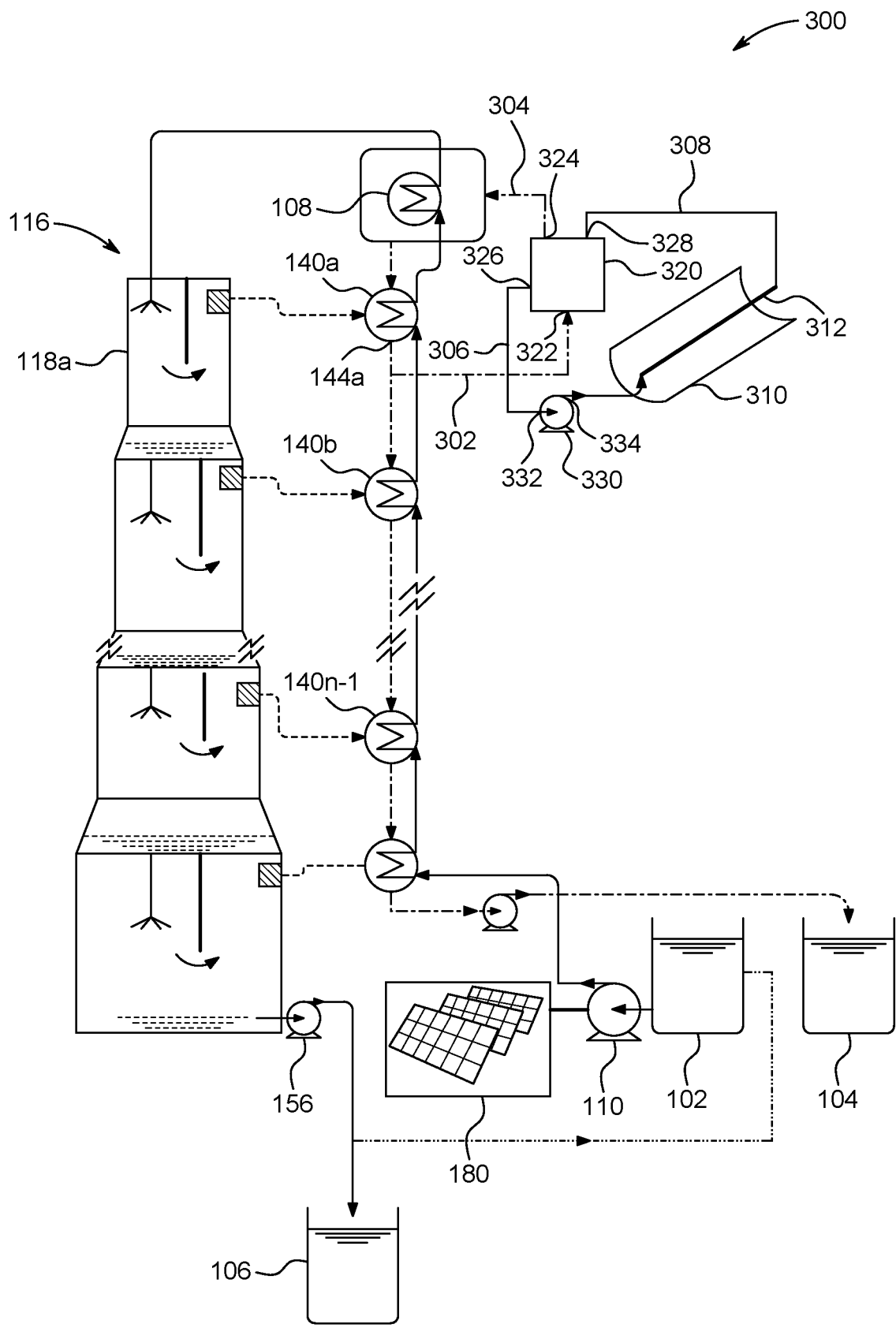
FIG. 3 is a schematic of a multi-stage flash (MSF) desalination system, according to a third embodiment.

Referring to FIG. 3, illustrated is a schematic of a multi-stage flash (MSF) desalination system 300 according to a third embodiment. The MSF desalination system 300 is similar to the MSF desalination system 100 as described in the preceding paragraphs, with generally similar configuration for the MSF tower 116 including its sub-components, the condensers 140a, 140b, . . . , 140n-1, etc. In the illustration of FIG. 3, another condenser has been shown next to the condenser 140n-1 in place of the compressor 160. This is exemplary only and shall not be construed limiting in any manner. The above-mentioned details for components of the MSF desalination system 100 have not been repeated herein for the description of the MSF desalination system 300 for the brevity of the present disclosure. Further, in the illustration of FIG. 3 for the MSF desalination system 300, some of the components, as shown for the MSF desalination system 100 in FIG. 1, have been omitted and some of the components have not been labelled, for simplicity and brevity.

As illustrated in FIG. 3, the MSF desalination system 300 includes a parabolic trough collector 310. The parabolic trough collector 310 has a heat transfer fluid (generally represented by reference numeral 312) passing therethrough. As may be understood, the parabolic trough collector 310 may heat up the heat transfer fluid 312 using energy from sun rays or the like. The sunlight which enters the mirror parallel to the plane of symmetry of the parabolic trough collector is focused along the focal line, where the heat transfer fluid is located. The MSF desalination system 300 further includes a heat exchanger 320 with four connection points, namely a first connection point 322, a second connection point 324, a third connection point 326 and a fourth connection point 328. As shown in FIG. 3, the heat exchanger 320 is fluidly connected to the outlet 144a of a first condenser (i.e., the condenser 140a) after the first stage (i.e., the stage 118a) in the MSF tower 116 at the first connection point 322 via 302 and to the BH 108 at the second connection point 324 via 304. The MSF desalination system 300 also includes a fourth pump 330 with ends 332, 334. The fourth pump 330 on one end 332 is fluidly connected to the heat exchanger 320 at the third connection point 326 via 306 and on another end 334 to the parabolic trough collector 310. Further, the parabolic trough collector 310 is fluidly connected 308 to the heat exchanger 320 at the fourth connection point 328, on an opposite end of the third connection point 326 to the fourth pump 330. As may be understood, the heat transfer fluid 312 travels through the connection points 322, 324, 326, 328 of the heat exchanger 320, the fourth pump 330, and the parabolic trough collector 310. This way the heat transfer fluid 312 may be used to increase temperature of the brine in the BH 108 before being supplied to in the MSF tower 116, for increasing efficiency of the MSF desalination system 300. In an example, the heat transfer fluid 312 is selected from a group consisting of distilled water and thermal oil.

Figure 4:
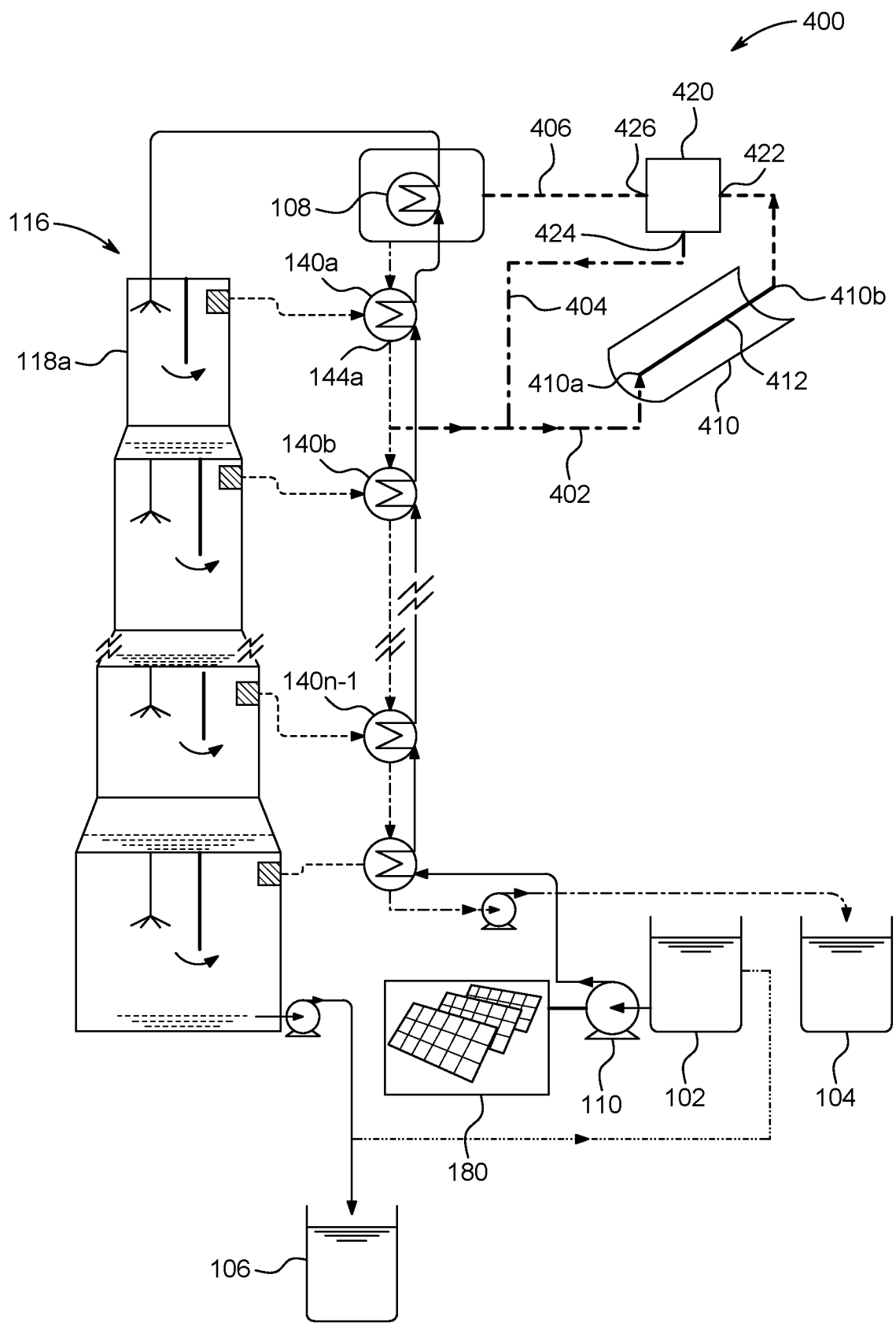
FIG. 4 is a schematic of a multi-stage flash (MSF) desalination system, according to a fourth embodiment.

Referring to FIG. 4, illustrated is a schematic of a multi-stage flash (MSF) desalination system 400 according to a fourth embodiment. The MSF desalination system 400 is similar to the MSF desalination system 100 as described in the preceding paragraphs, with generally similar configuration for the MSF tower 116 including its sub-components, the condensers 140a, 140b, . . . , 140n-1, etc. In the illustration of FIG. 4, another condenser has been shown next to the condenser 140n-1 in place of the compressor 160. This is exemplary only and shall not be construed limiting in any manner. The above-mentioned details for components of the MSF desalination system 100 have not been repeated herein for the description of the MSF desalination system 400 for the brevity of the present disclosure. Further, in the illustration of FIG. 4 for the MSF desalination system 400, some of the components, as shown for the MSF desalination system 100 in FIG. 1, have been omitted and some of the components have not been labelled, for simplicity and brevity.

As illustrated in FIG. 4, the MSF desalination system 400 includes a parabolic trough collector 410 with ends 410a, 410b. The parabolic trough collector 410 has a heat transfer fluid (generally represented by reference numeral 412) passing therethrough. As may be understood, the parabolic trough collector 410 may heat up the heat transfer fluid 412 using energy from sun rays or the like. The MSF desalination system 400 further includes a flash tank 420 with three connection points, namely a first connection point 422, a second connection point 424 and a third connection point 426. As shown, the parabolic trough collector 410 is fluidly connected 402 to the outlet 144a of a first condenser (i.e., the condenser 140a) after the first stage (i.e., the stage 118a) in the MSF tower 116 on the one end 410a and the first connection point 422 of the flash tank 420 on the opposite end 410b. Also, as shown, the second connection point 424 of the flash tank 420 is fluidly connected to 402 between the first condenser 140a and the parabolic trough collector 410, via 404. Further, as shown, the third connection point 426 of the flash tank 420 is fluidly connected to the BH 108 via 406. This way the heat transfer fluid 412 may be used to increase temperature of the brine in the BH 108 by providing steam from the flash tank before being supplied to in the MSF tower 116, for increasing efficiency of the MSF desalination system 400. This method also allows recycling of water that is not flashed in the flash tank, by repeating the cycle. In an example, the heat transfer fluid 412 is selected from a group consisting of: distilled water and thermal oil.

In some other aspects of the present disclosure, one or more of the MSF desalination system 100, 200, 300, 400 may include a parabolic solar dish (not shown). The parabolic solar dish is angled towards the BH 108. This way the parabolic solar dish may concentrate sun rays (after reflection therefrom) at the BH 108, and the heat generated therefrom may be used to increase temperature of the brine in the BH 108 before being supplied to in the MSF tower 116, for increasing efficiency of the MSF desalination system 100, 200, 300, 400. In some examples, the parabolic trough solar heater (as described) may be replaced by the parabolic solar dish that reflects solar energy directly into the brine heater 108 or heating steam flash tank for heating water to its required temperature similar to solar towers of solar power generation systems. Such implementation of the parabolic solar dish may be contemplated by a person skilled in the art and thus has not been described in more detail herein.

The present disclosure provides a highly efficient, easily manufactured, and economically viable RE-SPS-FCCS-MVC/TVC based MSF system allowing for CAPEX and OPEX reductions. The described configuration is applicable to small/medium scale, conventional and even large capacity MSF and to all MSF configurations. The present MSF desalination system results in substantial overall system performance enhancement and product water cost reduction. The present MSF desalination system is an economically viable alternative to reverse osmosis membrane technology and the other thermal Multi-Effect Distillation (MED) technologies.

Obviously, numerous modifications and variations of the present disclosure are possible in light of the above teachings. It is therefore to be understood that within the scope of the appended claims, the invention may be practiced otherwise than as specifically described herein.

The invention claimed is:
1. A multistage flash (MSF) desalination system, comprising:
a feed tank;
a brine heater (BH);
an MSF tower with n number of stages;
wherein n is an integer between 2-40;
n−1 number of condensers each with an inlet and an outlet; and
a desalinated water tank;
wherein the feed tank is fluidly connected to a first pump;
the first pump is fluidly connected to the BH at a higher elevation relative to the feed tank located at a top of the MSF tower;
wherein the MSF tower comprises:
a stepped pyramid shape with n number of connected chambers forming the n number of stages;
wherein the n number of stages located stepwise below each other are axially slip stacked at a 10-50° angle;
the n number of stages increases in volume by 10-30% with each stage;
the n number of stages have a drainage on a bottom face,
the n number of stages each containing at least one flash spray nozzle and a demister;
wherein the flash spray nozzle is proximal to an upper portion of the chamber; and
the flash spray nozzles are fluidly connected to the drainage of a previous stage other than the flash spray nozzle in a first stage at the top of the MSF tower;
wherein the flash spray nozzle in the first stage at the top of the MSF tower is fluidly connected to the BH;
the inlets of the condensers are fluidly connected to the demisters in the n−1 stages of the MSF tower;
the outlets of the condensers are fluidly connected to the next condenser of n−1 condensers;
wherein the outlet of the last condenser is fluidly connected to a second pump;
the second pump is fluidly connected to the desalinated water tank;
the drainage of a final stage at a bottom of the MSF tower is fluidly connected to a third pump;
the third pump is fluidly connected to a rejected brine tank.
2. The MSF desalination system of claim 1, wherein:
the chambers have the same height throughout the MSF tower.
3. The MSF desalination system of claim 1, wherein:
at least one of the chambers are made from at least one material selected from the group consisting of stainless steel, polycarbonate, polypropylene, polyurethane, polyethene, polystyrene, and polyvinyl chloride.

4. The MSF desalination system of claim 1, wherein:
the n number of flash spray nozzles are angled 10-50° along an axis pointing towards the direction of the next stage.

5. The MSF desalination system of claim 1, wherein:
the third pump is fluidly connected to the feed tank.

6. The MSF desalination system of claim 1, wherein:
the condensers are short tube heat exchangers; and
wherein the short tube heat exchangers are arranged adjacent to the MSF tower; and
the short tube heat exchangers are made from at least one of the materials from the group consisting of aluminum, copper, stainless steel, nickel and titanium.

7. The MSF desalination system of claim 1, wherein:
the BH and the flash spray nozzle in the first stage are connected by a tube made of titanium or 60-70 wt % copper with 30-40 wt % nickel;
the demisters and the inlet of the condensers, and the drainage of one stage to the flash spray nozzle of next stage in the MSF tower in a top half of the MSF tower are connected by a tube made of titanium and/or 60-70 wt % copper with 30-40 wt % nickel; and
the demisters and the inlet of the condensers, and the drainage of one stage to the flash spray nozzles of next stage in the MSF tower in a bottom half of the MSF tower are connected by a tube made of 80-90 wt % copper with 10-20 wt % nickel and/or 50-60 wt % aluminum with 40-50 wt % bronze.

8. The MSF desalination system of claim 1, further comprising:
a compressor;
a pressure stabilizer; and
a desuperheater;
the demister of the final stage at the bottom of the MSF tower is fluidly connected to the compressor;
the compressor is fluidly connected in series to the pressure stabilizer and then the desuperheater;
the desuperheater is fluidly connected to the BH.

9. The MSF desalination system of claim 8, wherein:
the compressor is selected from the group consisting of a mechanical vapor compressor, a thermal vapor compressor, and an absorption compression system.

10. The MSF desalination system of claim 8, further comprising:
an intercooler with a first end and a second end; and
a second compressor;
wherein the intercooler is fluidly connected to the compressor on the first end and the second compressor on the second end; and
the second compressor is fluidly connected to the pressure stabilizer.

11. The MSF desalination system of claim 1, further comprising:
a compressor with a first end and a second end;
wherein the compressor is fluidly connected on the first end to an opening in the first stage of the MSF tower; and
the compressor is fluidly connected to the pressure stabilizer on the second end.

12. The MSF desalination system of claim 1, wherein:
the drainage of at least one of the stages in a top half of the MSF tower is fluidly connected to the flash spray nozzle of at least one of the stages in a bottom half of the MSF tower.

13. The MSF desalination system of claim 1, further comprising:
a parabolic trough collector;
a heat exchanger with four connection points; and
heat transfer fluid;
wherein the heat exchanger is fluidly connected to the outlet of a first condenser after the first stage in the MSF tower at a first connection point and to the BH at a second connection point;
a fourth pump on one end is fluidly connected to the heat exchanger at a third connection point and on another end to the parabolic trough collector;
the parabolic trough collector is fluidly connected to the heat exchanger at a fourth connection point, on an opposite end of the third connection point to the fourth pump; and
wherein the heat transfer fluid travels through the connection points of the heat exchanger, the fourth pump, and the parabolic trough collector.

14. The MSF desalination system of claim 13, wherein:
the heat transfer fluid is selected from a group consisting of distilled water and thermal oil.

15. The MSF desalination system of claim 1, further comprising:
a parabolic trough collector; and
a flash tank with three connection points;
wherein the parabolic trough collector is fluidly connected to the outlet of a first condenser after the first stage in the MSF tower on one end and a first connection point of the flash tank on the opposite end;
a second connection point of the flash tank is fluidly connected between the first condenser and the parabolic trough collector; and
a third connection point of the flash tank is fluidly connected to the BH.

16. The MSF desalination system of claim 1, further comprising:
a parabolic solar dish; and
wherein the parabolic solar dish is angled towards the BH.

17. The MSF desalination system of claim 1, wherein:
the system is electrically connected to at least one from the group consisting of a photovoltaic panel, a wind turbine, and a bio-diesel engine.

18. The MSF desalination system of claim 1, wherein:
a plurality of MSF towers is connected in parallel.

* * * * *